(12) United States Patent
Prejean

(10) Patent No.: US 7,160,935 B2
(45) Date of Patent: Jan. 9, 2007

(54) TUBULAR REACTOR ETHYLENE/ALKYL ACRYLATE COPOLYMER AS POLYMERIC MODIFIERS FOR ASPHALT

(75) Inventor: George Wyatt Prejean, Orange, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 282 days.

(21) Appl. No.: 10/806,559

(22) Filed: Mar. 23, 2004

(65) Prior Publication Data

US 2004/0198874 A1    Oct. 7, 2004

Related U.S. Application Data

(60) Provisional application No. 60/460,645, filed on Apr. 4, 2003.

(51) Int. Cl.
*C08L 95/00* (2006.01)

(52) U.S. Cl. .......................................... 524/68; 524/69
(58) Field of Classification Search ............ 524/68–69; 525/222, 228
See application file for complete search history.

(56) References Cited

U.S. PATENT DOCUMENTS

| | | |
|---|---|---|
| 2,953,551 A | 9/1960 | White |
| 3,141,870 A | 7/1964 | Deex |
| 3,350,372 A | 10/1967 | Anspon et al. |
| 3,756,996 A | 9/1973 | Pugh et al. |
| 4,070,532 A | 1/1978 | Hammer |
| 4,157,428 A | 6/1979 | Hammer |
| 4,451,598 A | 5/1984 | Decroix |
| 4,650,820 A | 3/1987 | Decroix |
| 5,306,700 A | 4/1994 | Hojaji |
| 5,306,750 A | 4/1994 | Goodrich et al. |
| 5,532,066 A | 7/1996 | Latiolais et al. |
| 5,556,900 A | 9/1996 | Goodrich et al. |
| 6,011,095 A | 1/2000 | Planche et al. |
| 6,117,926 A | 9/2000 | Engber et al. |
| 6,399,680 B1 | 6/2002 | Engber et al. |
| 6,414,056 B1 | 7/2002 | Puzic et al. |

FOREIGN PATENT DOCUMENTS

| | | |
|---|---|---|
| DE | 1 644 771 | 4/1971 |
| EP | 0 106 999 B1 | 5/1984 |

OTHER PUBLICATIONS

PCT International Search Report for International application No. PCT/US2004/010044 dated Sep. 17, 2004.

*Primary Examiner*—Peter Szekely

(57) ABSTRACT

Polymeric modified asphalt for road paving applications wherein the polymer modifier is a tubular reactor produced ethylene/alkyl acrylate copolymer (e.g., EMA) optionally blended with an epoxy functionalized ethylene copolymer (e.g., EnBAGMA) and added to the asphalt with or without the use of an acid adjuvant (e.g., PSA).

9 Claims, 1 Drawing Sheet

TUBULAR REACTOR ETHYLENE/ALKYL ACRYLATE COPOLYMER AS POLYMERIC MODIFIERS FOR ASPHALT

CROSS-REFERENCE TO RELATED APPLICATIONS

Applicant claims the benefit of priority to provisional application 60/460,645 filed Apr. 4, 2003; herein incorporated by reference in its entirety.

BACKGROUND OF THE INVENTION

1. Field of the Invention

The present invention relates to a polymer modified asphalt composition. More specifically, but not by way of limitation, the present invention relates to the use of tubular reactor produced ethylene/alkyl acrylate copolymer preferably in combination with an epoxy functionalized ethylene/alkyl acrylate copolymer as polymer modifier for asphalt.

2. Description of the Related Art

It is generally known in the art and an accepted commercial practice to modify asphalt sold for paving applications by the addition of various polymers. Typically polymer additives are employed to improve rut resistance, fatigue resistance, and cracking resistance and sometimes to improve stripping resistance from the aggregate. These improvements tend to result from or correlate to increases in asphalt elasticity and stiffness upon addition of the polymer. Asphalts for paving are performance graded by a set of SHRP (Strategic Highway Research Program) specifications. For example, a PG58-34 asphalt should provide good rut resistance at 58° C. and good cracking resistance at −34° C. The addition of the polymer to the asphalt is known to significantly increase the first number (i.e., provides higher temperature rut resistance) and significantly improve fatigue resistance. The improvements in rut and fatigue resistance result from increases in stiffness and elasticity. In commercial applications, these increases are to be accomplished with relatively small amounts of polymer (i.e., 1 to 5 weight percent polymer). However, such small amounts of polymer do not sufficiently improve the low temperature properties to meet acceptable performance grades, although the properties are somewhat improved. Thus, good low temperature properties for asphalts are mainly obtained by addition of oils such as gas oil. Currently, the commercial polymer modified asphalt (PMA) market is dominated by the use of styrene/butadiene/styrene (SBS) type block copolymer additives. Typically the asphalt industry considers polymers for asphalt modification to be either categorically an elastomer or a plastomer. The term plastomer carries a negative connotation in that a plastomer lacks elastomeric properties. However, plastomers are sometimes used to modify asphalt because they can increase stiffness and viscosity which improves rut resistance but they are generally considered inferior to elastomers due to lack of significant improvements in fatigue resistance, creep resistance, cold crack resistance and the like. SBS polymer is considered an elastomer. There are mixed feelings in the industry as to how to categorize some polymeric asphalt additives.

For example, German patent 1,644,771 discloses and claims bitumen compositions made up of from 5 to 95 wt % aromatic petroleum asphalt and from 95 to 5 wt % of an ethylene/acrylate ester copolymer. The copolymer fraction is either an ethylene/alkyl acrylate or ethylene/alkyl methacrylate copolymer derived from copolymerization of ethylene and from 1 to 40 wt % of alkyl acrylate or alkyl methacrylate ester, wherein the alkyl groups contains from 1 to 8 carbon atoms. At these high concentrations, the ethylene/alkyl acrylate and ethylene/alkyl methacrylate would not be considered as acceptable polymeric additives for producing commercial grade polymeric modified asphalt (PMA) to be used in road paving applications.

In U. S. Pat. Nos. 5,306,700 and 5,556,900, PMA compositions useful in road paving and roofing applications are disclosed. These compositions include a reactive polymeric asphalt additive that chemically reacts and links to the asphalt as a result of the presence of an epoxy functional group. The reactive polymer additive is an ethylene copolymer of the general formula E/X/Y/Z where E represents the ethylene derived unit and constitutes from 20 to 99.5 wt % of the copolymer. The X can be present up to 50 wt % and is derived from, for example, alkyl acrylates, alkyl methacrylates, vinyl esters, or alkyl vinyl ethers. The Y is present in from 0.5 to 15 wt % and is to be derived from, for example, glycidyl acrylate, glycidyl methacrylate or glycidyl vinyl ether. The Z is optionally present up to 15 wt % and is derived from other monomers such as carbon monoxide, sulfur dioxide, acrylonitrile and the like. Of particular note is the reactive terpolymer ethylene/n-butyl acrylate/glycidyl methacrylate (EnBAGMA), which is known (after chemical linking to the asphalt) to significantly improve both elasticity and stiffness of the resulting PMA, much like elastomeric asphalt additive.

In U.S. Pat. Nos. 6,117,926 and 6,399,680, improved PMA compositions are taught wherein an asphalt and a stiffness-enhancing copolymer having available epoxy groups are reacted in the presence of an effective amount of an acid (e.g., $H_3PO_4$ and $H_2SO_4$) to promote chemical bonding between the asphalt and the available epoxy groups of the copolymer. The use of the acid is shown to minimize the amount of epoxy functionalized polymer additive (generally the most expensive component) required to achieve greater stiffness values over similar reaction times relative to no acid being present. The references also acknowledge that low temperature SHRP performance grades are attained by the addition of processing oils and additionally ethylene copolymers including specifically ethylene vinyl acetate (EVA), ethylene methyl acrylate (EMA), ethylene n-butyl acrylate (EnBA), and ethylene ethyl acrylate (EEA) copolymers may be blended with the polymer to achieve (unspecified) suitable results. U.S. Pat. Nos. 6,011,095 and 6,414,056 exemplify the specific use of polyphosphoric acid (PPA) and/or superphosphoric acid (SPA) as the acid adjuvant in the promotion of the chemical bonding between asphalt and the available epoxy groups of ethylene/methyl acrylate/glycidyl methacrylate terpolymer (EMAGMA) and ethylene/n-butyl acrylate/glycidyl methacrylate terpolymer (EnBAGMA), respectively.

BRIEF SUMMARY OF THE INVENTION

Occasionally during commercial asphalt paving applications of the above acid-reacted PMA compositions using superphosphoric and/or polyphosphoric acids and an epoxy functionalized ethylene copolymer additive, e.g., EnBAGMA, certain deficiencies and problems have been discovered or observed relating to the use of the acid. For example, the addition of the SPA or PPA acid too quickly to the EnBAGMA and/or the use of too much EnBAGMA tend to lead to asphalt gelling. Also, the above acid-reacted PMA system has been found to be incompatible with certain conventional amine antistrip agents. Thus addition of an amine antistrip agents trend to destroy the superior asphalt properties imparted by the EnBAGMA which again is felt to be related to the presence of the SPA or PPA. And because of the above reactivity, gelling and incompatibility the total additive package is not amenable to production and subsequent use of concentrates. Furthermore, the use of highly corrosive PMA, its storage and subsequent introduction into molten asphalt represents significant pragmatic problems and concerns.

In view of the above mentioned problems associated with prior art acid-reacted PMA paving applications, it has now been discovered that tubular reactor produced ethylene/alkyl acrylate and ethylene/alkyl methacrylate copolymer (characterized as having greater comonomer heterogeneity within the polymer, less long chain branching, and higher melting point at equal ester comonomer content than conventional autoclave batch-reactor produced ethylene copolymer) will act as polymeric asphalt additive by increasing elasticity and stiffness of the resulting PMA without the use of acid. The tubular reactor produced ethylene/alkyl acrylate copolymers of the present invention can also be advantageously blended with epoxy functionalized ethylene copolymers, e.g., EnBAGMA, for use in a reactive PMA composition with or without the use of an acid adjuvant. These tubular reactor produced ethylene/alkyl acrylate copolymers are also amenable to asphalt emulsion applications and asphalt additive concentrate applications.

Thus, the present invention provides a polymer modified asphalt composition comprising:
(a) an asphalt; and
(b) from 0.5 to 10 parts by weight of a tubular reactor produced ethylene/alkyl acrylate copolymer for every 100 parts by weight of the asphalt.

The present invention also provides a polymer modified asphalt composition as described above further comprising:
(c) from 0.5 to 10 parts by weight of an epoxy functionalized ethylene copolymer for every 100 parts by weight of the asphalt.

In this embodiment the weight ratio of the tubular reactor produced ethylene/alkyl acrylate copolymer to the epoxy functionalized ethylene copolymer is from 1.5 to 6.7 and the cumulative amount of the tubular reactor produced ethylene/alkyl acrylate copolymer and the epoxy functionalized ethylene copolymer is from 1.5 to 4.0 parts by weight per 100 parts by weight of the asphalt.

The present invention also provides a process for producing polymer modified asphalt comprising the steps of:
(a) melt blending an asphalt with from 0.5 to 10 parts by weight of a tubular reactor produced ethylene/alkyl acrylate copolymer for every 100 parts by weight of the asphalt; and
(b) recovering a polymer modified asphalt having improved elasticity and stiffness.

Optionally the process of the present invention also involves the step of:
(c) melt blending with the asphalt and the ethylene/alkyl acrylate copolymer from 0.5 to 10 parts by weight of an epoxy functionalized ethylene copolymer for every 100 parts by weight of the asphalt.

In one specific embodiment of the process the weight ratio of the tubular reactor produced ethylene/alkyl acrylate copolymer to the epoxy functionalized ethylene copolymer is from 1.5 to 6.7 and in another specific embodiment no acid adjuvant is added to the asphalt.

The present invention further provides an asphalt additive composition comprising a blend of:
(a) from 5 to 95 parts by weight of a tubular reactor produced ethylene/alkyl acrylate copolymer; and
(b) from 95 to 5 parts by weight of an epoxy functionalized ethylene copolymer.

BRIEF DESCRIPTION OF SEVERAL VIEWS OF THE DRAWINGS

The FIGURE represents a plot of the stiffness factor, i.e., the ratio of the complex shear modulus (G*) divided by the sin of the phase angle (sin δ), (G*)/(sin δ), vs. weight percent of the polymer additive in the asphalt for various types of polymer additive.

DETAILED DESCRIPTION OF THE INVENTION

Figure 1:
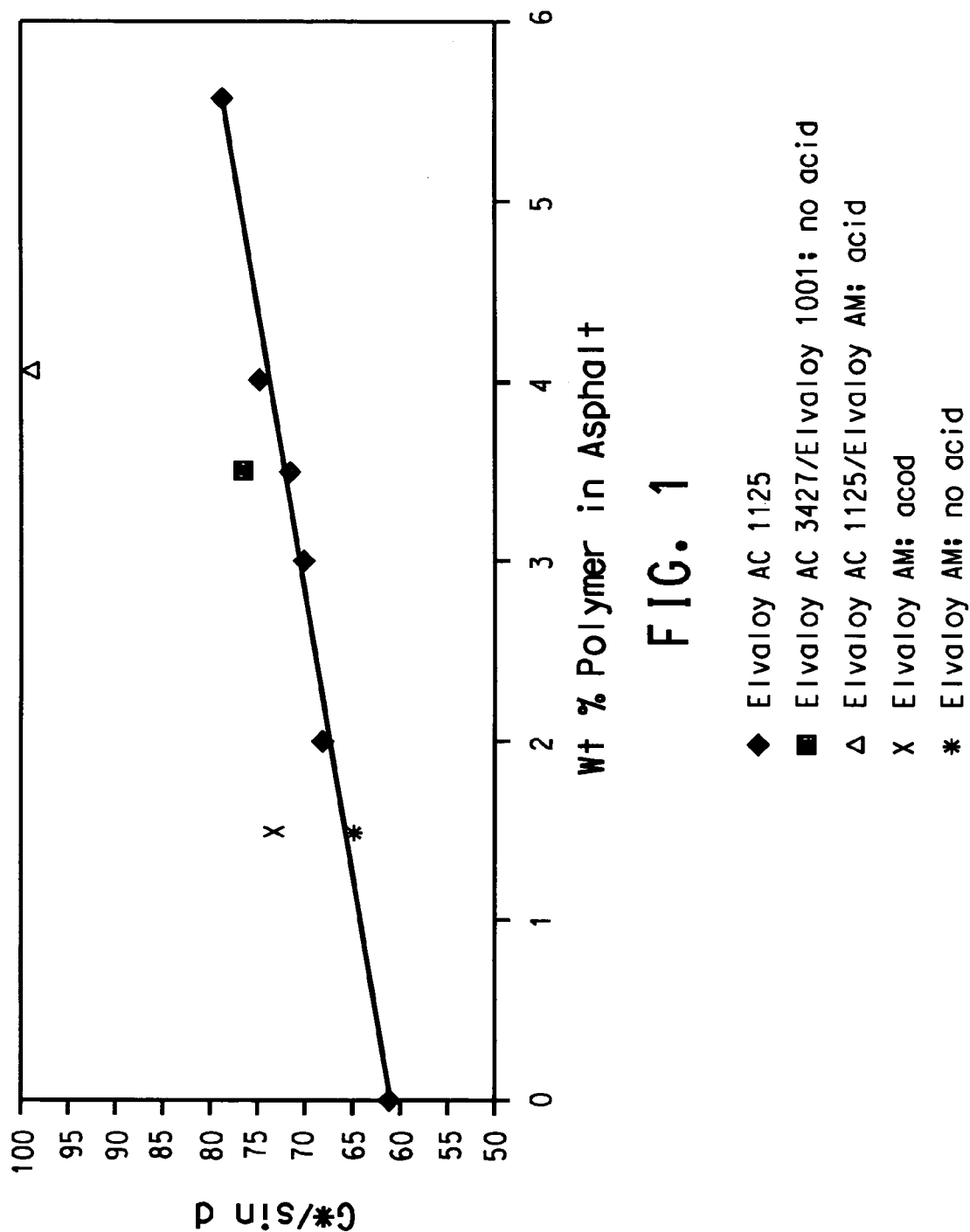

The asphalt useful in the present invention is essentially any such asphalt or bitumen material generally acknowledged as and/or used in road paving surfaces and similar roadway applications. As such the terms asphalt and bitumen should be considered equivalent for purposes of this invention. Generally any natural occurring and/or synthetically manufactured asphalt or bitumen are suitable. Naturally occurring asphalts include by way of example but are not limited to such materials derived from native rock asphalt, lake asphalt, and the like. Synthetically manufactured asphalts typically include asphaltic by-products of petroleum refining operations and include air-blown asphalt, propane asphalt, straight-run asphalt, thermal asphalt and the like.

The tubular reactor produced ethylene/alkyl acrylate copolymer useful in the present invention is an ethylene copolymer derived from the copolymerization of ethylene monomer and at least one additional alkyl acrylate or alkyl methacrylate comonomer, wherein the alkyl group contains from 1 to 8 carbon atoms. More specifically, the tubular reactor produced ethylene/alkyl acrylate copolymer according to the instant invention is to be distinguished from a more conventional autoclave produced ethylene/alkyl acrylate as generally known in the art. Thus the term or phrase "tubular reactor produced" ethylene/alkyl acrylate copolymer, for purposes of this invention, denotes an ethylene copolymer produced at high pressure and elevated temperature in a tubular reactor or the like, wherein the inherent consequences of dissimilar reaction kinetics for the respective ethylene and alkyl acrylate comonomers is alleviated or partially compensated by the intentional Introduction of the monomers along the reaction flow path within the tubular reactor. As generally recognized in the art, such a tubular reactor copolymerization technique will produce a copolymer having a greater relative degree of homogeneity along the polymer backbone (a more random distribution of comonomers), will tend to reduce the presence of long chain branching and will produce a copolymer characterized by a higher melting point than one produces at the same comonomer ratio in a high pressure stirred autoclave reactor.

The relative amount of the alkyl acrylate comonomer incorporated into the tubular reactor produced ethylene/alkyl acrylate copolymer can, in principle, vary broadly from a few weight percent up to as high as 40 weight percent of the total copolymer or even higher. Similarly, the choice of the alkyl group can, again in principle, vary from a simple methyl group up to an eight-carbon atom alkyl group with or without significant branching. The relative amount and choice of the alkyl group present in the alkyl acrylate ester comonomer can be viewed as establishing how and to what degree the resulting ethylene copolymer is to be viewed as a polar polymeric constituent in the MPA blend. Most preferably, the methyl acrylate (i.e., viewed as the most polar comonomer) is employed at a concentration range of from 20 to 30 weight percent of the total tubular reactor produced ethylene/methyl acrylate copolymer; EMA (20–30% MA). Tubular reactor produced ethylene/alkyl acrylate copolymers of this nature are commercially available under the tradename Elvaloy® AC from E. I. du Pont de Nemours and Company, Wilmington, Del.

To further illustrate and characterize the tubular reactor produced ethylene/alkyl acrylate copolymer according to the instant invention relative to conventional autoclave produced copolymer, the following list of commercially available ethylene/methyl acrylate copolymers with associated melting point data show that tubular EMA resins have considerably higher melting points vs. autoclave EMA's due to a very different MA distribution along polymer chains:
Exxon Mobil, N.J.; EMA (21.5 wt % MA) mp=76° C.
Exxon Mobil, N.J.; EMA (24 wt % MA) mp=69° C.
Atofina, France; EMA (20 wt % MA) mp=80° C.
Atofina, France; EMA (24 wt % MA) mp=73° C.
Elvaloy® AC1125; DuPont EMA (25 wt % MA) mp=88° C.
Elvaloy® AC1820; DuPont EMA (20 wt % MA) mp=95° C.

The tubular reactor produced ethylene/methyl acrylate copolymer useful in the present invention can vary significantly in molecular weight as witnessed by tubular reactor produced EMA having a melt index numerically in terms of a fraction up to about ten showing significant improvement in both stiffness and elasticity particularly relative to autoclave produced EMA as illustrated herein later in comparative data of the examples. The specific selection of the melt index grade of polymer additive to be used will be influenced by balancing the onset of improved elastic recovery associated with higher relative molecular weight EMA (such as Elvaloy® AC1125 with a 0.7MI) versus the pragmatic ability to more easily blend asphalt with a relatively lower molecular EMA (such as Elvaloy® AC1820 with a 8MI). However, both the stiffness and the elastic recovery of the PMA blends according to the instant invention have been observed to improve across a broad melt index range consistent with the view that tubular reactor produced EMA is categorically an elastomer additive and not merely a plastomer. Surprisingly, this effect is achieved without the use of an acid adjuvant such as superphosphoric acid. Also, preliminary measurements suggest a rise in ultimate viscosity of the resulting PMA asphalt blend when employing tubular reactor produced EMA as the sole additive, indicative of a chemical reaction of this additive in the direction of forming a polymeric elastomer composition. Early evidence suggests that this feature of the invention is more broadly applicable to a greater variety of different asphalt sources than what is generally acknowledged in the art of PMA asphalt modification; i.e., each asphalt source is different and thus utility of each polymer modifier must be verified relative to each asphalt source. Furthermore, the amount or concentration of the tubular reactor EMA employed in the asphalt is generally well below that taught in the German patent 1,644,771 when using the conventional autoclave produced ethylene/acrylate ester copolymer bitumen compositions, again confirming that tubular reactor produced EMA as a commercial grade polymer modifier for road paving asphalt. More specifically, current testing indicates the tubular reactor EMA at 6 weight percent or less loading in the asphalt will produce commercial grade PMA compositions relative to improved stiffness and elasticity without resorting to the PSA treatment. Surprisingly, when the tubular reactor produced EMA is combined with an epoxy functionalized ethylene copolymer (e.g., EnBAGMA at 1 to 2 wt %) the required concentration or loading of the tubular reactor produced EMA drops to less than about 4 weight percent, again without the necessity of PSA treatment.

The actual manufacturing of the tubular reactor EMA as previously stated is preferably in a high pressure, tube reactor at elevated temperature with additional introduction of reactant comonomer along the tube and not merely manufactured in a stirred high temperature and pressure autoclave type reactor. However, it should be appreciated that similar EMA material can be produced in a series of autoclave reactors wherein comonomer replacement is achieved by multiple zone introduction of reactant comonomer as taught in U.S. Pat. Nos. 3,350,372; 3,756,996; and 5,532,066, and as such these high melting point materials should be considered equivalent for purposes of this invention.

The epoxy functionalized ethylene copolymer useful in the present invention and methods of employing the same are generally any such polymer as known and practiced in the art such as, for example, those copolymers and methods of use disclosed and taught in U.S. Pat. Nos. 5,306,750; 5,556,900; 6,011,095; 6,117,926; 6,414,056 and 6,399,680, herein incorporated by reference. The significant improvement in asphalt properties with addition of the epoxy functionalized ethylene copolymers (e.g., EnBAGMA) at such low concentrations (e.g., 1 to 2 wt. %) is believed due to a chemical reaction between the reactive copolymer additive and the functionalized polar fraction of asphalt referred to as asphaltenes. As taught in the later references, acids in general and specifically superphosphoric acid (SPA) are currently used to enhance the performance of the epoxy functionalized ethylene copolymer when added to asphalt. Some improvements in asphalt properties can be obtained when epoxy containing reactive polymer additive is used without the addition of SPA, however the mixing time is very long (24+ hours vs. 3–6 hours with SPA) and the final asphalt properties are never as good. Thus as illustrated individually and collectively in the above mention prior art, chemical bonding of the reactive epoxy functionalized ethylene copolymer to the asphalt produces a PMA asphalt typically exhibiting one or more improved properties such as: improved dynamic shear rheometer stiffness values without appreciable loss in the G* viscous component of the complex modulus; improved low temperature creep stiffness and "m" value; higher temperature stiffness values for the ratio of the complex G* to the sin of the phase angle, (G*)/(sin δ), at 10 radian/sec; improved low phase angle and elastic recovery at 25° C. or the like.

Preferably reactant copolymer useful in the present invention are terpolymers and sometimes tetrapolymers or higher copolymers derived from the copolymerization of: (i) ethylene; (ii) at least one alkyl acrylate, alkyl methacrylate, vinyl carboxylate, or vinyl alkyl ether wherein the alkyl or carboxyl is from 1 to 8 carbon atoms; and (iii) at least one epoxy functionalized comonomer such as for example but not limited thereto glycidyl acrylate, glycidyl methacrylate, or vinyl glycidyl ether. Generally the ethylene content of the copolymer is from 20 to 99.5 wt % of the total copolymer, the other comonomer, (ii), will range from 0 to 50 wt % of the total copolymer and the reactive epoxy containing comonomer will constitute from 0.5 to 15 wt % of the total copolymer.

Such copolymers are well known in the art and are described, for example, in U.S. Pat. Nos. 4,070,532 and 4,157,428. Most preferably the epoxy functionalized ethylene copolymer is a terpolymer of ethylene, n-butyl acrylate and glycidyl methacrylate, EnBAGMA. These copolymers are commercially available under the tradename Elvaloy® AM from E. I. du Pont de Nemours and Company, Wilmington, Del.

Typically the epoxy functionalized ethylene copolymer additive is employed in the present invention at relatively low levels of loading in the asphalt. Generally from 0.5 to 10 wt % of the ethylene copolymer relative to the asphalt is sufficient with concentrations of 1 to 2 wt % of Elvaloy® AM in the asphalt being preferred. According to the present invention, even lower loading levels are particularly preferred when the Elvaloy® AM is employed in combination with the tubular reactor ethylene/methyl acrylate copolymer Elvaloy® AC at total polymer additive concentrations approaching 5 or less wt % relative to the asphalt, as illustrated in the examples herein.

It should be appreciated that the use of other asphalt additives as generally practiced in the asphalt road-surface paving applications are felt to be compatible with the PMA compositions of the present invention. Thus the obvious use of aggregate with the PMA is contemplated. Also, the incorporation of an antistrip agent including those traditionally based on amine chemistry is also contemplated particularly when low levels or no acid adjuvant is employed. However, the intentional use of acid and in particular SPA is felt to be compatible with the PMA compositions particularly when optimizing PMA properties and minimizing the processing time to achieve these properties is desirable. Also, since the improved properties are predominantly related to stiffness and elasticity, the use of various asphalt oils, fuel oils, asphalt flux and the like to achieve and meet low temperature specifications also felt to be a part of the use of the PMA compositions of the instant inventions. Similarly, the intentional use of SBS type additives is also contemplated.

The method and sequence of steps employed to produce the PMA blend of asphalt, tubular reactor produced ethylene/alkyl acrylate copolymer and epoxy functionalized can be by any of the methods and equipment as generally described in the prior art, particular those patents incorporated by reference above. This includes sequential addition of acid to the asphalt before and after polymer addition, notwithstanding apparent conflicting teachings and data respectively found in these references, provided the appropriate caveats and teachings found, for example, in Table 10 of Example E of U.S. Pat. No. 6,117,926 are taken into consideration. However as a practical/pragmatic consideration, the addition of the polymer additive and the blending with the asphalt prior to PSA treatment is most preferred particularly when practicing the invention in conjunction with an already hot asphalt isolated/produced during an oil refining operations.

The benefits and advantages of the instant invention are felt to be numerous and significant. First and foremost, the use of the tubular reactor produced ethylene/alkyl acrylate copolymer as an asphalt polymeric additive, with or without the use of epoxy functionalized ethylene copolymer and/or subsequent SPA acid treatment, increases the elasticity and stiffness of the resulting PMA at concentration levels consistent PMA paving applications heretofore unachievable by conventional autoclave produces ethylene/alkyl acrylate copolymer. Also, the significant reduction of the use of acid according to the present invention is felt to advantageously alleviate and reduce the incidence of asphalt gelling and simultaneously improve compatibility with the use of conventional amine-type antistrip agents particularly when the epoxy functionalized ethylene copolymer is also employed. The polymer additive compositions useful in the present invention are also amenable to the production and use of concentrates and should be emulsifiable leading to asphalt emulsion applications that resist separation and emulsion breaking. Advantageously, the use of the PMA of the instant invention does not involve high intensity mixers nor crosslinking with the evolution of $H_2S$ as experienced in SBS additives and simultaneously exhibits higher thermal stability relative to SBS.

EXAMPLES

The following examples are presented to more fully demonstrate and further illustrate various aspects and features of the present invention. As such, the showings are intended to further illustrate the differences and advantages of the present invention but are not meant to be unduly limiting.

In preparing the PMA compositions found in the various runs of the examples. 500 gram samples were mixed at 190° C. for 3 hours in open cans utilizing a conventional paddle mixer. The 3 hours proved sufficient to obtain a homogeneous blend of the polymer in the asphalt. In measuring the dynamic shear rheometer values (DSR), a sinusoidal test that determines both the elastic and viscous components of PMA, test specification defined by TP5 of AASHTO was employed. The measurement was performed at a cycle time of 10 radians per second. This is generally representative of the time for one cycle of loading due to 55 mph traffic. The test separates the contribution of the elastic and viscous components of the complex modulus G* The value of $G^*/\sin \delta$ (defined in the Tables) must be 1 or above at the expected maximum pavement temperature (average 7 day maximum) on the original sample and 2.2 on the RTFO (i.e., rolling thin film oven, 163° C. (325° F.), 85 minutes, ASTM 2872-97) sample. The RTFO simulates short-term aging from hot mixing and construction. Elastic recovery of bituminous material by ductilometer is a measure of asphalt elasticity and was run at either 25° C. or 10° C. on the original sample and/or on the RTFO sample. A molded specimen was elongated at a rate of 5 cm/mm to a total length of 10 cm and then cut and the percent recovery was measured (ASTM D6084-97).

Examples 1 and 2

A series of six polymer modified asphalts were prepared as previously described. The first run was a control employing a commercial grade of epoxy functionalized ethylene copolymer, EnBAGMA, at typical polymer additive concentration (1.5 wt %) for a PMA paving application. The second and third runs involved a tubular reactor produced ethylene/methyl acrylate copolymer (25 wt % MA) characterized by a melt index of 0.7 blended with two different asphalts at 4 wt % polymer additive concentration according to the instant invention. The final three runs involved an ethylene vinyl acetate copolymer (33 wt % VA) and two autoclave produced ethylene/methyl acrylate for comparison. The details and resulting data for these runs are presented in the following Table 1. These data show the tubular reactor EMA behaving similar to the reactive EnBAGMA polymer additive and superior to the autoclave EMA or EVA polymers.

TABLE 1

Mix Time = 3 hours
Mix Temperature 190° C.

| | | | Resin | | | |
|---|---|---|---|---|---|---|
| | CONTROL Elvaloy ® AM | Elvaloy AC1125 | Elvaloy AC1125 | Elvax ® 150 | Lotryl ® 24MA00 | Lotryl 20MA08 (5) |
| Resin Composition | E/28NBA/5GMA | E/25MA | E/25MA | E/33VA | E/24MA | E/20MA |
| MI | 12 | 0.7 | 0.7 | | 0.7 | 8 |
| Resin Conc., wt % | 1.5 | 4 | 4 | 4 | 3 | 3 |
| Asphalt Type | PG58-28 | PG58-28 | PG 61-28 | PG58-28 | PG58-28 | PG58-28 |
| Asphalt Supplier | Conoco | Conoco | Valero | Conoco | Conoco | Conoco |
| Original Sample | | | | | | |
| Phase Angle w/o AS (1) | 72.5 | 73.2 | 75 | 80.8 | 80.3 | 82.9 |
| Pass/Fail w/o AS (2) | 70.7 | 73.4 | 74.7 | 74 | 78.2 | 77.3 |
| PG Grade w/o AS | 70 | 70 | 70 | 70 | 76 | 76 |
| 25° C. Elastic Recovery w/o AS (3) | 75 | 70 | | 60 | 50 | 40 |
| Phase Angle w AS | | | 75 | | | |
| Pass/Fail w AS | | | 74.4 | | | |
| PG Grade w AS | | | 70 | | | |
| 25° C. Elastic Recovery w AS | | | | | | |
| RTFO Sample (4) | | | | | | |
| Phase Angle w/o AS | | | 75 | | | |
| Pass/Fail w/o AS | | | 75 | | | |
| PG Grade w/o AS | | | 70 | | | |
| 25° C. Elastic Recovery w/o AS | | | | | | |
| Phase Angle w AS | | | 73 | | | |
| Pass/Fail w AS | | | 73.5 | | | |
| PG Grade w AS | | | 70 | | | |
| 25° C. Elastic Recovery w AS | | | | | | |

(1) The angle, d, by which the sine curve of the strain lags the sine curve of the stress is called the phase angle d. The phase angle for a Newtonian liquid is 90 and for a purely elastic substrate it is 0.
(2) The temperature at which the value of G*/sin d = 1.G* = Complex Modulus, d = phase angle, AS = antistrip agent. Value of the ratio (G*/sin d) must be 1 or greater at upper PG grade temperature e.g., Pass/Fail = 72.8 (G*/sin d = 1) then the PG grade will be 70 (G*/sind is >1 at 70° C.)
(3) A measure of how much strain is recovered when an asphalt sample is stretched
(4) RTFO = rolling thin film oven used to simulate short term asphalt aging that occurs when it is mixed with hot aggregate and applied to roads
(5) Autoclave EMA produced by Atofina Examples 3–22

In an manner analogous to Examples 1 and 2, a series of twenty additional polymer modified asphalts were prepared using a blend of a tubular reactor produced ethylene/alkyl acrylate copolymer and an epoxy functionalized ethylene/alkyl acrylate/glycidyl methacrylate terpolymer. The first eight runs were performed without the subsequent addition of acid. The following twelve polymer modified asphalts were treated with superphosphoric acid (equivalent to 105% $H_3PO_4$) at two different acid concentrations. Three different commercially available asphalts were employed. The details and resulting data for these runs are presented in the following Table 2. These data show both improved stiffness and elasticity when a combination of the tubular reactor EMA copolymer with the reactive EnBAGMA is employed as the polymer additive at reduced total polymer loading.

TABLE 2

| wt % SPA (1) | Base Asphalt | Phase Angle | Pass/Fail | PG Grade | Elastic Recovery | wt % Polymer | Blend Composition (3) | |
|---|---|---|---|---|---|---|---|---|
| 0 | Ardmore 58-28 | 69.2 | 75.8° C. | PG70 | 70 (25° C.) | 3.5 | 28.5 wt % - Elvaloy 1001 | 71.5% - Elvaloy AC 1224 |

TABLE 2-continued

| wt % SPA (1) | Base Asphalt | Phase Angle | Pass/ Fail | PG Grade | Elastic Recovery | wt % Polymer | Blend Composition (3) | |
|---|---|---|---|---|---|---|---|---|
| 0 | Ultrimar 52-34 | 74.6 | 63.7° C. | PG58 | 70 (25° C.) | 3.5 | 28.5 wt % - Elvaloy 1001 | 71.5% - Elvaloy AC 1224 |
| 0 | Ardmore 58-28 | 73.3 | 74.2° C. | PG70 | 55 (25° C.) | 3.5 | 28.5 wt % - Elvaloy AM | 71.5% - Elvaloy AC 1224 |
| 0 | Ultrimar 52-34 | 79.3 | 68.2° C. | PG64 | 65 (25° C.) | 3.5 | 28.5 wt % - Elvaloy AM | 71.5% - Elvaloy AC 1224 |
| 0 | Ardmore 58-28 | 67.6 | 76.4° C. | PG76 | 70 (25° C.) | 3.5 | 28.5 wt % - Elvaloy 1001 | 71.5% - Elvaloy AC 3427 |
| 0 | Ultrimar 52-34 | 73 | 66.4° C. | PG64 | 55 (25° C.) | 3.5 | 28.5 wt % - Elvaloy 1001 | 71.5% - Elvaloy AC 3427 |
| 0 | Ardmore 58-28 | 71.2 | 74.3° C. | PG70 | 60 (25° C.) | 3.5 | 28.5 wt % - Elvaloy AM | 71.5% - Elvaloy AC 3427 |
| 0 | Ultrimar 52-34 | 74.6 | 64.7° C. | PG64 | 70 (25° C.) | 3.5 | 28.5 wt % - Elvaloy AM | 71.5% - Elvaloy AC 3427 |
| 0.15 | Conoco 58-28 | 74.6 | 68.4° C. | PG64 | 60 (10° C.), 60 (25° C.) | 2.5 | 40 wt % - Elvaloy AM | 60% - Elvaloy AC 1125 |
| 0.15 | Conoco 58-28 | 78.1 | 69.9° C. | PG64 | 55 (10° C.), 50 (25° C.) | 2.5 (2) | 40 wt % - Elvaloy AM | 60% - Elvaloy AC 1125 |
| 0.15 | Conoco 58-28 | 73.3 | 70.8° C. | PG70 | 65 (10° C.), 65 (25° C.) | 3 | 40 wt % - Elvaloy AM | 60% - Elvaloy AC 1125 |
| 0.3 | Conoco 58-28 | 73.8 | 73.5 | 70 | 65 (25° C.) | 2.5 | 20 wt - Elvaloy EP4170 | 80 wt - Elvaloy AC-1530XP |
| 0.3 | Conoco 58-28 | 73 | 73.90 | 70 | 66 (25° C.) | 2.5 | 20 wt - Elvaloy EP1001 | 80 wt - Elvaloy AC-1530XP |
| 0.3 | Conoco 58-28 | 71.1 | 73.8 | 70 | 67 (25° C.) | 2.5 | 20 wt - Elvaloy EP1001 | 80 wt - Elvaloy AC-1820 |
| 0.3 | Conoco 58-28 | 75.4 | 73.00 | 70 | 60 (25° C.) | 2.5 | 13 wt - Elvaloy EP1001 | 87 wt - Elvaloy AC-1530XP |
| 0.3 | Conoco 58-28 | 73.4 | 72.9 | 70 | 55 (25° C.) | 2.5 | 13 wt - Elvaloy EP1001 | 87 wt - Elvaloy AC-1820 |
| 0.3 | Conoco 58-28 | 79 | 68 | 64c | 45 (4° C.) | 1.5 | 15 wt - Elvaloy AM + | 85 wt - Elvaloy AC 1125 |
| 0.3 | Conoco 58-28 | 64.8 | 94.9 | 82 | 52.5 (4° C.) | 4 | 15 wt - Elvaloy AM + | 85 wt - Elvaloy AC 1125 |
| 0.3 | Conoco 58-28 | 77.7 | 68.9 | 64c | 45 (4° C.) | 1.5 | 20 wt - Elvaloy AM + | 80 wt - Elvaloy AC 1125 |
| 0.3 | Conoco 58-28 | 63.2 | 99.1 | 82 | 57.5 (4° C.) | 4 | 20 wt - Elvaloy AM + | 80 wt - Elvaloy AC 1125 |

(1) Superphosphoric acid
(2) 0.5 wt % amine antistrip added
(3) Elvaloy 1001
Elvaloy AM
Elvaloy AC 1125
Elvaloy AC 1224
Elvaloy AC 3427
Elvaloy AC 1820
Elvaloy AC 1530XP
E/22NBA/12GMA, MI = 12
E/28NBA/5GMA, MI = 8
E/25MA, MI = 0.7
E/24MA, MI = 2
E/27NBA, MI = 4
E/20MA, MI = 8
E/30MA, MI = 5

Examples 23–25

Three additional polymer modified asphalts were prepared in a manner analogous to the previous examples using a blend of tubular reactor produced EMA and EnBAGMA. In each run 2.5 wt % of the tubular reactor EMA and 1.0 wt % of the EnBAGMA was added to the same asphalt and the elastic recovery and phase angle were measured as the PMA asphalt was aged. The resulting data are presented in Table 3.

TABLE 3

|   | 2.5 wt % Elvaloy AC 1125<br>1 wt % Elvaloy AM<br>Ardmore Asphalt 58-28 | 2.5 wt % Elvaloy AC 1125<br>1 wt % Elvaloy AM<br>Ardmore Asphalt 58=28 | 2.5 wt % Elvaloy AC 3427<br>1 wt % Elvaloy AM<br>Ardmore Asphalt 58-28 |
|---|---|---|---|
| Separation, % | 4.0 | 9.3 | 0.3 |
| Solubility | 99.9 | 99.95 | 99.98 |
| % Elastic Recovery @ 10° C. (ASTM 6084) | 70 | 72.0 | 65 |
| % Elastic Recovery @ 25° C. (ASTM 6084) | 70 | 70 | 70 |
| Phase Angle | 77.7 | 76.13 | 75.41 |
| Pass/fail temp., ° C. | 71.5 | 70.1 | 71.1 |
| PG Grade | 70 | 70 | 70 |
| RTFO Phase Angle | 72.2 | 70.35 | 70.2 |
| RTFO, pass/fail | 72.2 | 70.9 | 71.4 |
| RTFO, PG | 70 | 70 | 70 |
| Phase Angle (15 Days, 0.5 wt % Antistrip) | 77.59 | | |
| Pass/fail temp., ° C. (15 Days, 0.5 wt % Antistrip) | 72.9 | | |
| PG Grade (15 Days, 0.5 wt % Antistrip) | 70 | | |
| Phase Angle (7 Days, 0.5 wt % Antistrip) | | 72.63 | |
| Pass/fail temp., ° C. (7 Days, 0.5 wt % Antistrip) | | 73.0 | |
| PG Grade (7 Days, 0.5 wt % Antistrip) | | 70 | |
| RTFO Phase Angle (7 Days, 0.5 wt % Antistrip) | | 66.02 | |
| RTFO, pass/fail temp., ° C. | | 73.7 | |
| RTFO, PG Grade | | 70 | |

Having thus described and exemplified the invention with a certain degree of particularity, it should be appreciated that the following claims are not to be so limited but are to be afforded a scope commensurate with the wording of each element of the claim and equivalents thereof.

I claim:

1. A polymer modified asphalt composition comprising:
   a) an asphalt;
   b) from 0.5 to 10 parts by weight of a tubular reactor produced ethylene/alkyl acrylate copolymer for every 100 parts by weight of said asphalt; and
   c) from 0.5 to 10 parts by weight of an epoxy functionalized ethylene copolymer for every 100 parts by weight of said asphalt.

2. A polymer modified asphalt composition of claim 1 wherein the weight ratio of said tubular reactor produced ethylene/alkyl acrylate copolymer to said epoxy functionalized ethylene copolymer is from 1.5 to 6.7 and the cumulative amount of said tubular reactor produced ethylene/alkyl acrylate copolymer and said epoxy functionalized ethylene copolymer is from 1.5 to 4.0 parts by weight per 100 parts by weight of said asphalt.

3. A polymer modified asphalt composition of claim 1 or 2 wherein an acid adjuvant is added to the asphalt.

4. An asphalt additive composition comprising a blend of:
   (a) from 5 to 95 parts by weight of a tubular reactor produced ethylene/alkyl acrylate copolymer; and
   (b) from 95 to 5 parts by weight of an epoxy functionalized ethylene copolymer.

5. An asphalt additive of claim 4 wherein the weight ratio of said tubular reactor produced ethylene/alkyl acrylate copolymer to said epoxy functionalized ethylene copolymer is from 1.5 to 6.7.

6. A process for producing polymer modified asphalt comprising the steps of:
   (a) melt blending an asphalt with from 0.5 to 10 parts by weight of a tubular reactor produced ethylene/alkyl acrylate copolymer for every 100 parts by weight of said asphalt;
   (b) recovering a polymer modified asphalt having improved elasticity and stiffness; and
   (c) melt blending with said asphalt and said ethylene/alkyl acrylate copolymer from 0.5 to 10 parts by weight of an epoxy functionalized ethylene copolymer for every 100 parts by weight of said asphalt.

7. A process of claim 6 wherein the weight ratio of said tubular reactor produced ethylene/alkyl acrylate copolymer to said epoxy functionalized ethylene copolymer is from 1.5 to 6.7.

8. A process according to claim 6 or claim 7 wherein no acid adjuvant is added to the asphalt.

9. A process according to claim 6 or claim 7 wherein an acid adjuvant is added to the asphalt.

* * * * *

UNITED STATES PATENT AND TRADEMARK OFFICE
CERTIFICATE OF CORRECTION

PATENT NO.       : 7,160,935 B2
APPLICATION NO.  : 10/806559
DATED            : January 9, 2007
INVENTOR(S)      : George Wyatt Prejean It is certified that error appears in the above-identified patent and that said Letters Patent is hereby corrected as shown below:

Column 4, line 54, "mer having a greater relative degree of homogeneity along" should read -- mer having a greater relative degree of heterogeneity along --.

Column 4, line 55, "the polymer backbone (a more random distribution of" should read -- the polymer backbone (a less random distribution of --.

Signed and Sealed this

Fifteenth Day of April, 2008

JON W. DUDAS
*Director of the United States Patent and Trademark Office*